B. POWELL.
FISH HOOK.
APPLICATION FILED MAY 4, 1918.

1,286,095.

Patented Nov. 26, 1918.

WITNESSES

INVENTOR
Burke Powell
BY
ATTORNEYS

UNITED STATES PATENT OFFICE.

BURKE POWELL, OF ALBIA, IOWA.

FISH-HOOK.

1,286,095.	Specification of Letters Patent.	Patented Nov. 26, 1918.

Application filed May 4, 1918. Serial No. 232,516.

*To all whom it may concern:*

Be it known that I, BURKE POWELL, a citizen of the United States, and a resident of Albia, in the county of Monroe and State of Iowa, have invented a new and Improved Fish-Hook, of which the following is a description.

My invention relates to fish hooks, and more particularly to a fish hook especially adapted to carry a live bait as the lure.

Objects of the invention are to provide a fish hook on which the live bait may be held in a manner to present a natural appearance and with the minimum injury that the bait may remain alive for a long period; to provide lure-securing means that will not interfere with the taking of the lure; and to provide a construction and arrangement of the lure-holding means and the main landing hook such as will result in a deep and firm engagement of the landing hook when the fish strikes.

The stated objects and others as will appear, are attained by a lure hook, novel in its form and in its relation to the landing hook at the inside of the bill of the landing hook, and by a secondary lure-holding means on the shank of the landing hook rearward of said lure hook as will be understood from the description hereinafter given.

Reference is to be had to the accompanying drawings forming a part of this specification, it being understood that the drawings are merely illustrative of one example of the invention.

Figure 1:
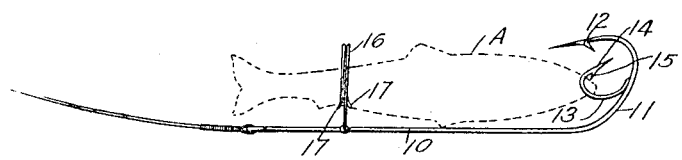
Figure 1 is a side elevation of a fish hook constituting a practical example of my invention.
Figure 2:
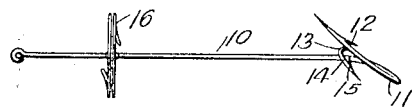
Fig. 2 is a side view taken at right angles to Fig. 1.

In embodying my invention in a fish hook in accordance with the illustrated example, a main hook or landing hook designated generally by the numeral 10 is employed having a shank of a length for a live bait indicated at A to be disposed when in position, lengthwise of the shank, and the bill 11 of said hook, which terminates in a rearwardly disposed pointed end as usual and with a forwardly disposed barb 12, is so bent or twisted as to lie in a general plane oblique to the shank of the hook.

In accordance with my invention a lure hook 13 is fast on the landing hook at the bill 11 thereof at the interior of said bill. The hook 13 presents a short shank extending rearwardly from the bill 11, said lure hook being positioned on the bill between the shank 10 and the barb 12, the pointed end of the main landing hook extending rearwardly beyond the lure hook. It will be seen therefore that the lure hook is comparatively small and in a general way is positioned within the bill of the main hook. The point 14 of the lure hook 13 extends forwardly, that is, in the opposite direction from the rearwardly disposed point of the main hook, the barb 15 of the lure hook being disposed rearwardly. The lure hook 13 is given a twist to one side of the shank 10 while the bill or hook proper extends in a plane oblique to the longitudinal plane of the shank 10. The point and barb of the lure hook thus extend across the plane in which the shank 10 lies and extends to the opposite side of the shank from the point of the main hook and its barb 12. The form of the lure hook and its disposition relatively to the main landing hook are such that the lure A when being secured is engaged with the lure hook 13 when the lure is at an acute angle to the shank 10, the lure after engagement with the lure hook 13 being brought laterally inward to lie lengthwise of said shank 10.

Figure 3:
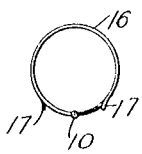
Fig. 3 is a cross section through the shank of the main hook in looking rearwardly.

In order to hold the lure A lengthwise of the shank 10 and parallel therewith, I provide a secondary lure-holding device 16, generally of ring-like form as clearly seen in Fig. 3. The said holding device 16 presents two oppositely curved elements secured to and emanating from the shank 10 at opposite sides rearward of the bill 11 and presenting free ends 17 at opposite sides of the shank 10. Thus, the holder 16 is yielding and resilient, so that the tail of the lure A may be passed rearwardly through the holder 16, whereby the lure will be securely restrained against displacement. With a live bait thus impaled at the head by the lure hook 13 and loosely embraced by the holding device 16, it will be impossible for the bait to become displaced by movement in a forward direction, by reason of the relation of the main and lure hooks and the slight space between the pointed end of the lure hook and the barb of the main hook.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A fish hook including a main landing hook having a rearwardly curved barbed terminal, and a lure hook fast on the landing hook at the interior of the bill thereof, said lure hook extending rearwardly from its connection with the landing hook and being then curved forwardly so that its terminal is oppositely disposed to that of the landing hook.

2. A fish hook including a main landing hook, and a lure hook in fixed position on the main hook at the interior of the bill thereof, said lure hook presenting a forwardly disposed point and a rearwardly disposed barb; together with a secondary holding device of general ring-form on the shank of the main hook rearward of the lure hook and into which the lure may be passed.

3. A fish hook including a landing hook, means fast on said hook at the rear side of the bill between the shank and barb of said landing hook and adapted to engage into a lure at the head of the latter, and means on the shank of the landing hook rearward of the lure hook to embrace the body of the lure.

4. A fish hook including a landing hook, and a lure hook having a short shank secured to the landing hook at the bill of the latter, the point of said lure hook being forwardly disposed and its barb rearwardly disposed, and the lure hook being smaller in its entirety than the bill of the landing hook so that the rearwardly disposed point of the latter extends beyond said lure hook.

5. A fish hook including a main landing hook, and a small lure hook having its shank secured to the bill of the landing hook between the shank and barb of said landing hook, the point and barb of the lure hook being in a plane oblique to the shank of the landing hook.

6. A fish hook including a main landing hook having its rearwardly disposed point positioned to lie at a side of the shank of said hook and in a plane oblique to said shank, and a small lure hook fast on the landing hook at the interior of the bill thereof, said lure hook having the bill thereof disposed oppositely to the bill of the landing hook and lying obliquely to the shank of the landing hook.

7. A fish hook including a main landing hook, means on the landing hook at the bill thereof to engage into a lure, and a yielding lure fastener of general ring-form on the shank of the landing hook rearward of the front end thereof, and comprising oppositely curved resilient elements each presenting a free terminal.

8. A fish hook including a main landing hook, and a lure hook fast on the main hook and outside of which the barbed end of the main hook extends, the free end of said lure hook being disposed oppositely to the barbed end of the main hook and in a plane oblique to the shank of the main hook to require the positioning of the lure at an angle to the main shank for engaging the lure hook with the lure; together with means on the shank of the main hook rearwardly of said lure hook to receive and to hold the lure when brought to a position alongside of and lengthwise of said main shank.

BURKE POWELL.

Copies of this patent may be obtained for five cents each, by addressing the "Commissioner of Patents, Washington, D. C."